Feb. 12, 1935. W. D. LINDSEY 1,990,659
TEMPERATURE RESPONSIVE SYSTEM AND DEVICE
Original Filed May 11, 1931   2 Sheets-Sheet 1
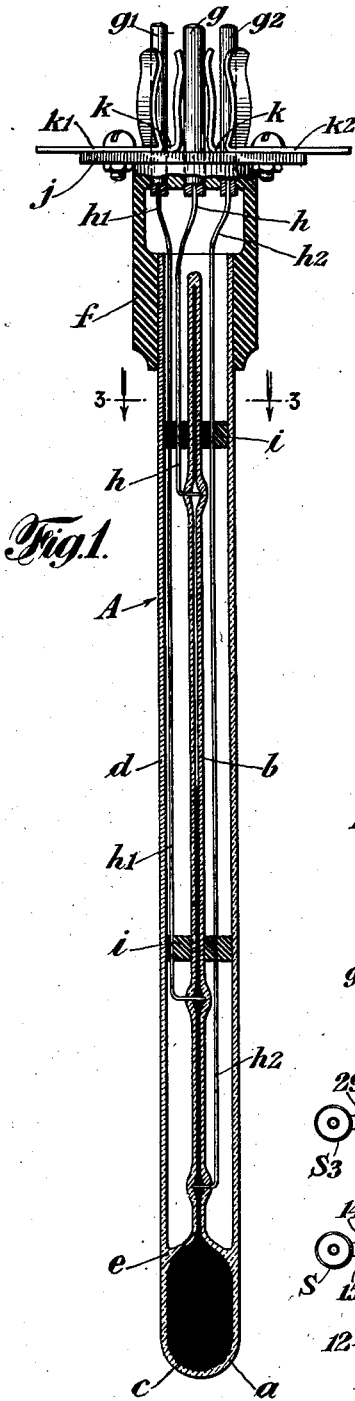
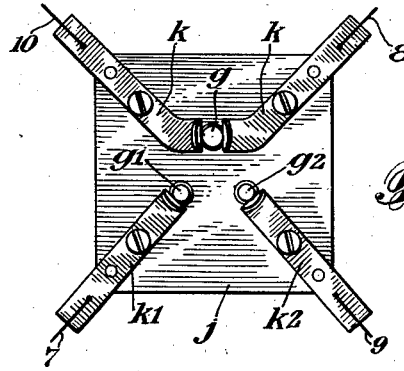
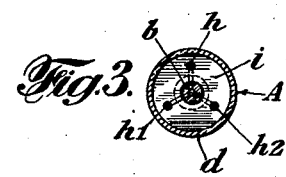
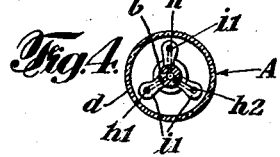
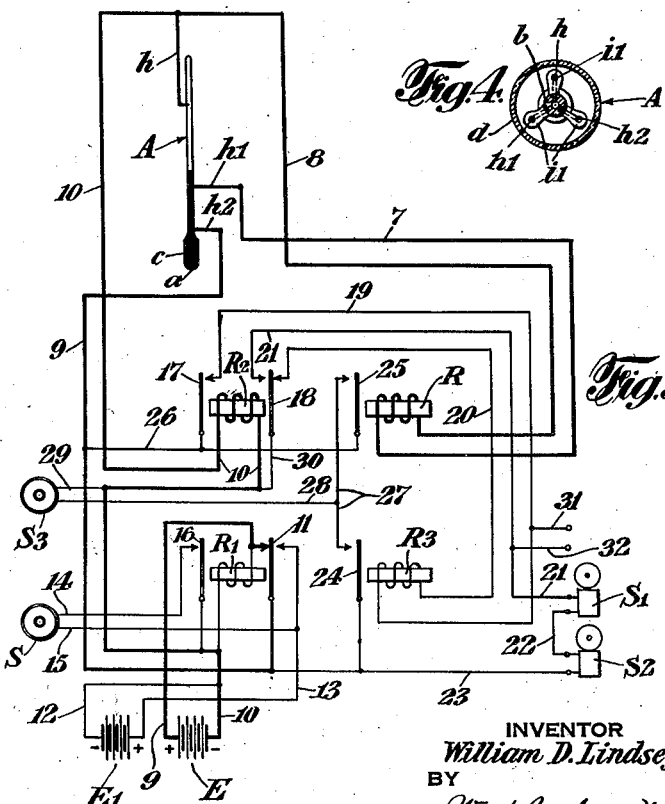
INVENTOR
William D. Lindsey
BY
Ward, Crosby & Neal
ATTORNEYS

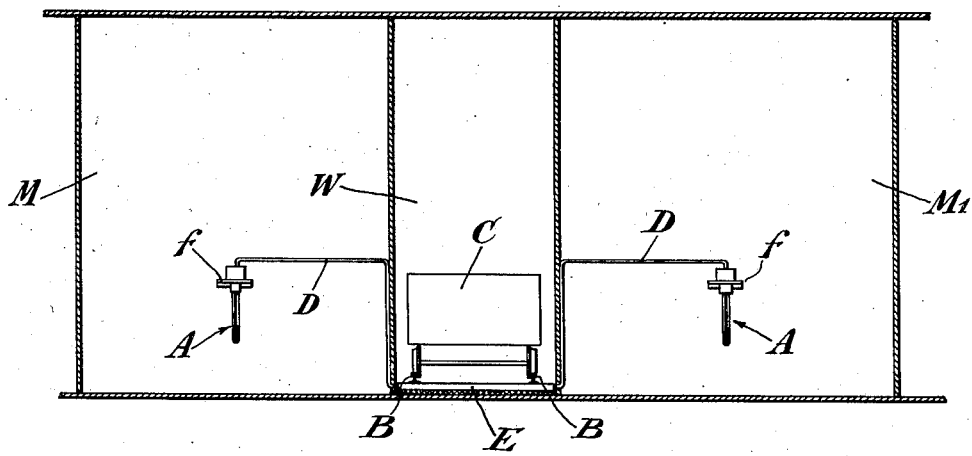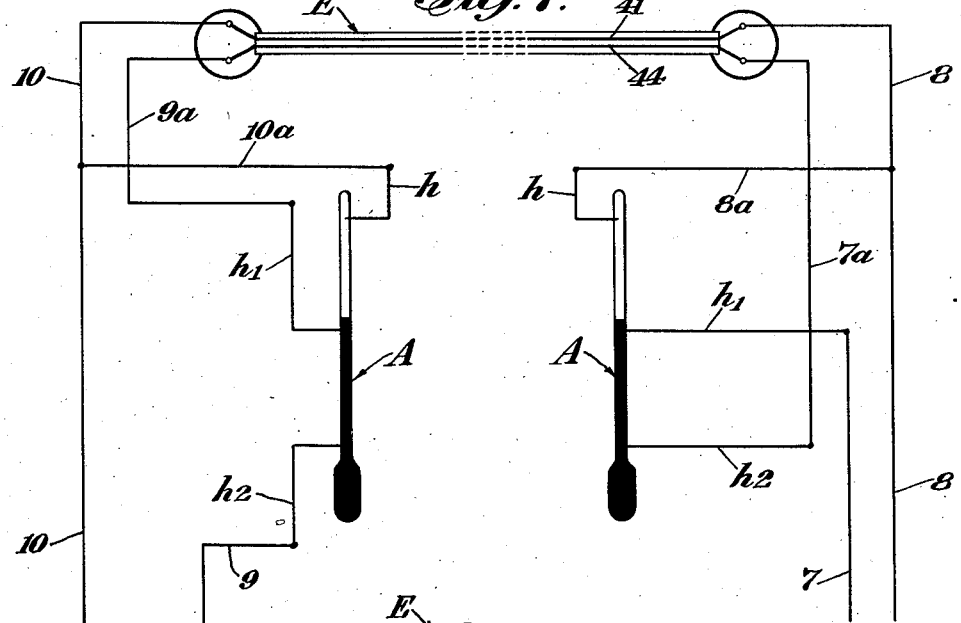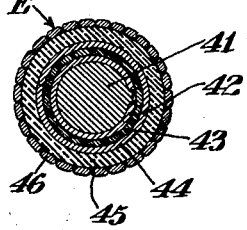

Patented Feb. 12, 1935

1,990,659

UNITED STATES PATENT OFFICE

1,990,659

TEMPERATURE RESPONSIVE SYSTEM AND DEVICE

William D. Lindsey, South Orange, N. J., assignor to Garrison Fire Detecting System, Inc., New York, N. Y., a corporation of Delaware Application May 11, 1931, Serial No. 536,402
Renewed December 29, 1934

3 Claims. (Cl. 177—355)

My invention relates to a temperature responsive system and has particular reference to a temperature responsive device of such a system which is adapted for supervision.

My invention, in a prominent phase thereof, relates to a temperature responsive device of the thermometer type, the arrangement being such that said device may be connected into a supervised electrical circuit.

Further objects, advantages and characteristics of my invention will become apparent from the following description taken in connection with the accompanying drawings.

My invention resides in the system, temperature responsive device, thermometric device, features and details of construction of the character hereinafter described and claimed.

For an understanding of my invention and for an illustration of one of the many forms of my temperature responsive device together with an illustration of other phases of my invention, reference is to be had to the accompanying drawings, in which:

Figure 1 is a vertical sectional view, partly in elevation, of a thermometric device and an associated contact-making device as constructed in accordance with my invention;

Fig. 2 is a plan view of the arrangement shown in Fig. 1;

Fig. 3 is a horizontal sectional view, partly in plan, and is taken on the line 3—3 of Fig. 1;

Fig. 4 is a horizontal sectional view, partly in plan and is illustrative of a modified detail of the device of Fig. 1;

Fig. 5 is a diagram of circuit connections;

Fig. 6 is a diagrammatic illustration of another phase of my invention;

Fig. 7 is another diagram of circuit connections; and

Fig. 8 is a sectional view of a fire detecting cable.

Referring particularly to Fig. 1, my novel temperature responsive device A is shown as comprising a bulb or chamber $a$ carrying a stem or tube $b$ which communicates therewith. Preferably, the bulb $a$ and stem $b$ are formed from glass the same or somewhat the same as an ordinary thermometer, said bulb $a$ and stem $b$ forming a closed chamber from which the air has been suitably exhausted as is customary in the thermometric art. The bulb $a$ contains a suitable quantity of a fluid $c$ which is adapted to expand when elevated in temperature and which has the characteristic of being a good conductor for electricity. Ordinarily, the aforesaid fluid $c$ is mercury and this term will be hereinafter generically applied thereto.

Disposed preferably concentrically with respect to the tube $b$ is an outer tube $d$ preferably of glass and sealed at $e$ to the bulb $a$. The outer tube $d$ may be approximately as long as the inner tube $b$ and, adjacent the open end thereof, should have a base $f$ of suitable electricity-insulating material cemented or otherwise suitably secured thereto.

Projecting from and carried by the base $f$ in spaced preferably parallel relation are a plurality of contact members $g$, $g1$ and $g2$ formed from electricity-conducting material. Secured, respectively, to the contact members $g$, $g1$ and $g2$ are the electrical conductors $h$, $h1$ and $h2$ which extend into the space between the inner tube $b$ and the outer tube $d$. To the end that the conductors $h$, $h1$ and $h2$, at their respective ends, may be disposed in the path of the mercury column in the tube $b$, it is desirable that each conductor be formed with a lateral end section which is passed through and sealed in the wall of the tube $b$ preferably at a slightly enlarged section thereof. By virtue of such an arrangement, it follows that the extreme end of each of said conductors $h$, $h1$ and $h2$ is disposed squarely in the path of the mercury column in the tube $b$. As shown, the conductor $h$ is thus associated with the tube $b$ relatively near the free end thereof, the conductor $h1$ is similarly associated with said tube $b$ relatively near the bulb $a$, and the conductor $h2$ is likewise associated with said tube $b$ quite near the bulb $a$.

Any suitable arrangement may be provided for maintaining the conductors $h$, $h1$ and $h2$ in non-contacting relation within the tube $d$. As shown in Figs. 1 and 3, blocks $i$ of suitable electricity-conducting material are spaced and retained longitudinally in said tube $d$, said blocks $i$ having passages through which the respective conductors extend whereby they are maintained preferably in equidistant relation Fig. 3. Alternatively, if desired, the tube $b$ may be provided with integral bead sections $i1$ spaced preferably equidistantly, Fig. 4, the conductors $h$, $h1$ and $h2$ passing through these bead sections $i1$, respectively.

As stated, the base $f$ should be cemented to the tube $d$. In a similar or equivalent manner, the contact members $g$, $g1$ and $g2$ should be secured to the base $f$. It results, therefore, that the tube $b$ and the conductors $h$, $h1$ and $h2$ are disposed within a space which is substantially or entirely moisture and waterproof. This is highly desirable and is a feature of distinct advantage in connection with the device described above.

Furthermore, the aforesaid space, which is bounded by the inner tube $b$ and the outer tube $d$ prevents or substantially impedes ready heat radiation, this feature apparently assuring accuracy and uniformity in the expansion and contraction of the mercury.

Any suitable arrangement may be provided for associating the contact members $g$, $g1$ and $g2$ with the terminals of a supervisory and signaling electrical circuit. As herein shown, there is thus utilized a base plate $j$ of suitable electricity-insulating material to which contact members $k$, $k$, $k1$ and $k2$ are secured in suitable manner, said contact members preferably extending beyond the base plate $j$ for ready attachment to the respective terminals of the aforesaid electrical circuit.

As shown herein, the contacts members $g$, $g1$ and $g2$ are disposed preferably in triangular relation on the base $j$ and, under such circumstances, the base plate $j$ should be provided with triangularly related passages for the reception of the respective contact members $g$, $g1$, and $g2$. As shown, the contact sections proper of the contact members $k$, $k$, $k1$ and $k2$ extend laterally from the base plate $j$ and, to the end that there may be wiping contact with the contact members $g$, $g1$ and $g2$, the contact sections of the members $k$, $k$, are disposed partly in alinement with the passage for the contact member $g$, the contact section of the member $k1$ is similarly disposed with respect to the passage for the contact member $g1$, and the contact section of the member $k2$ is likewise disposed with respect to the passage for the contact member $g1$.

As clearly illustrated, the contact member $g$ has wiping contact with both the contact sections of the members $k$, $k$. This is an important feature of the invention because removal of the contact member $g$ produces an open circuit across the contact sections of the members $k$, $k$. This characteristic of the invention will be hereinafter specifically described.

It is desirable that the contact member $g$ be of greater diameter than the contact members $g1$, $g2$ and that the passages in the base plate $j$ for the respective contact members $g$, $g1$ and $g2$ correspond in diameter therewith, respectively. By virtue of such an arrangement, the contact members $g$, $g1$ and $g2$ may be associated with the contact members $k$, $k$, $k1$ and $k2$ in but one relation.

A temperature responsive device of the character hereinbefore described is adapted for association with a supervisory and signaling electrical circuit which controls a signal device or exercises any other suitable control function when the device A is detached from the base plate $j$, when the mercury column completes a circuit between the conductors $h$ and $h1$, when the mercury column recedes and opens the circuit between the conductors $h1$, and $h2$, when the bulb $a$ becomes broken permitting release of the mercury therefrom and from the tube $b$, etc. In Fig. 5, I have illustrated a supervisory and signaling circuit which functions in the manner just stated. A similar circuit is disclosed in Fig. 1 of my copending application Serial No. 388,148, filed August 24, 1929, said application describing the various functions of that circuit when associated with a fire detecting cable comprising a fusible core, an encircling sheath, and a layer of insulating material disposed therebetween. With the temperature responsive device A herein disclosed, the circuit through that section of the mercury column between the terminals of conductors $h1$ and $h2$ may be considered as corresponding with the circuit through the core of the aforesaid cable, and the circuit through the contact members $k$, $g$ and $k$ may be considered as corresponding with the circuit through the aforesaid cable sheath. For convenience of description, the device A as shown in Fig. 5 is directly connected in the supervisory and signaling circuit by the conductors $h$, $h1$ and $h2$ although in commercial practice it will be understood that a contact-making device such, for example, as shown in Figs. 1 and 2 is utilized for this purpose.

Referring now to Fig. 5, conductors 7 and 8 are shown as connected, respectively, to the conductors $h1$ and $h$, the conductors 7 and 8 including the winding of a relay R. Connected, respectively, to the conductors $h2$ and $h$ are the conductors 9 and 10. The conductor 9 includes the armature 11 of a relay R1 and is connected to a suitable source of electrical energy E. The conductor 10 includes the winding of a relay R2 and is connected to the other terminal of said source of electrical energy E. The winding of relay R1 is connected across the aforesaid conductors 9 and 10 and hence across said source of electrical energy E.

A second source of electrical energy E1 has the respective conductors 12 and 13 connected to the terminals thereof. Conductor 12 is connected to the aforesaid conductor 10 while the conductor 13 terminates in a contact coactable with the armature 11 of relay R1.

Connected to the terminals of a suitable signal device S are the respective conductors 14 and 15. Conductor 14 terminates in a contact coactable with an armature 16 of the relay R1 while the conductor 15 is connected to the aforesaid conductor 13.

The relay R2 comprises armatures 17 and 18, Conductors 19 and 20 terminate in contacts coactable, respectively, with said armatures 17 and 18, said conductors 19 and 20 including the winding of a relay R3.

A conductor 21 terminates in a contact coactable with the aforesaid armature 18, said conductor 21 leading to one terminal of a suitable signal device S1, the other terminal of which is connected by a conductor 22 to one terminal of another signal device S2. The other terminal of the latter is connected to a conductor 23 leading to and connected to the aforesaid conductor 9. An extension of the conductor 23 leads to and is connected to an armature 24 of the aforesaid relay R3.

The relay R comprises an armature 25 to which is connected a conductor 26 leading to the armature 17 of relay R2 and also to the conductor 9.

A conductor 27 comprises contacts coactable, respectively, with the armature 25 of relay R and with the armature 24 of relay R3. Connected to the conductor 27 is a conductor 28 leading to one terminal of a suitable signal device S3, the other terminal of which is connected, by a conductor 29, to the aforesaid conductor 10 which also has connected thereto a conductor 30 leading to the aforesaid armature 18 of relay R2.

Conductors 31 and 32 connected, respectively, to the conductors 19 and 21 lead to an auxiliary suitable signal device or devices, not shown, but which, ordinarily, is or are disposed in a region remote from the signal devices S1 and S2.

The herein described temperature responsive device A is intended to be disposed or placed in some region wherein the temperature may depart from some predetermined range. As herein illustrated, the device A is in its "normal" condition when there is a column of mercury in the tube $b$ between the conductors $h1$ and $h2$. In the event that the mercury column rises as high as the conductor $h$, a control function is exercised by the herein described circuit and, in addition, a control function is exercised if the aforesaid mercury column recedes below the conductor $h2$. Rise of the mercury column is effected in response to increase in ambient temperature. Recession of the mercury column may be effected by decrease in ambient temperature or because of fracture of the bulb $a$.

The condition of the various relays, including their armatures, is as illustrated in Fig. 5 if it is assumed that the device A is in normal condition, i. e., that there is a column of mercury between the conductors $h1$ and $h2$, that there are no broken wires or loose connections in the circuit equipment, and that the voltage of the source of electrical energy E is at a proper value and that the circuit thereof is not open.

The herein described source of electrical energy E may be, and ordinarily is, an ordinary 6-volt storage battery. This battery E constitutes the main source of supply of electrical energy, the other source of electrical energy E1 being supplementary and utilizable, if desired, in the event that the voltage of the main battery E decreases to an abnormal extent; ordinarily, the supplementary battery E1 may comprise a plurality of dry cells suitably connected whereby the voltage thereacross is substantially 6 volts.

In accordance with my invention, the circuit arrangement hereinbefore described involves a plurality of semi-independent circuits so arranged that there may be electrical supervision of (1) the temperature responsive device A and the equipment associated directly therewith, (2) the various signals, and (3) the source of electrical energy E. Further and of importance, the circuit arrangement is such that an indication or control function is obtained in the event that the mercury column rises to or beyond the conductor $h$ or recedes below the conductor $h1$.

*Supervision of the temperature responsive device A and the control exercised thereby upon predetermined decrease of ambient temperature or fracture of the bulb a*

As hereinbefore described, the conductor 9 extends from one terminal of the battery E and is connected to the conductor $h2$ of the device A, conductor 7 which is connected to the conductor $h1$ leading to one terminal of the winding of relay R, the other terminal of which is connected to the conductor $h$ by the conductor 8, said conductor $h$ being connected to the conductor 10 which leads back to the other terminal of the battery E. In this circuit, the armature 11 of relay R1 is included as are the windings of relays R and R2. The winding characteristics of relays R and R2, however, are different and so related that the current flow is sufficient to cause the relay R to be operated, but insufficient to cause the relay R2 to be operated. Hence, under normal conditions, the armatures of relays R and R2 remain in the position illustrated in Fig. 5. If the circuit described immediately above should be broken for any reason, such as caused, for example, by recession of the mercury column below the conductor $h1$ in response to decrease of ambient temperature or by breakage of the bulb $a$, the relay R is deenergized and, therefore, its armature 25 moves into engagement with the contact at the adjacent end of conductor 27. As a result, a circuit is closed through the signal device S3, this circuit including the conductor 9 leading from the positive terminal of battery E, the conductor 26, armature 25, conductor 27, conductor 28, the signal device S3, conductor 29, and thence back to the negative terminal of the battery E by way of conductor 10. The signal device S3 is actuated by the resultant current flow to indicate that, for one reason or another, the mercury column has receded below the conductor $h1$.

*Signal supervision*

For signal supervision, there normally exists a circuit as follows: From the positive terminal of battery E, conductor 9, conductor 23, to and through the energizing winding of signal device S2, the conductor 22, to and through the energizing winding of signal device S1, conductor 21, conductor 32, to and through the energizing winding of the remotely positioned signal device, if utilized, conductor 31, conductor 19, winding of relay R3, conductor 20, armature 18 of relay R2, conductor 30, and thence by way of conductor 10 back to the negative terminal of the battery E.

In the circuit just described, the resistance characteristics of the various signal devices, on the one hand, and the winding characteristics of relay R3, on the other hand, are different to an extent permitting operation of said relay R3 without causing operation of any of the signal devices. Accordingly, relay R3 maintains its armature 24 in the position illustrated.

Should the just described circuit be broken for any reason, the circuit through the winding of relay R3 is opened and this relay becomes deenergized to permit its armature 24 to engage the contact at the adjacent end of conductor 27. In response to such deenergization of relay R3, a circuit is completed through the signal device S3, this circuit extending by way of conductor 9 from the positive terminal of battery E, conductor 23, armature 24 of relay R3, conductor 27, conductor 28, signal device S3, conductor 29, and thence back to the negative terminal of battery E by way of the conductor 10. The signal device S3 is actuated by the resultant current flow to indicate the presence of any trouble, such as a broken wire or loose connection, in the signal devices S1, S2 or the remotely positioned signal device connected to the conductors 31 and 32.

*Battery supervision*

As hereinbefore described, the conductor 9 extends from one terminal of battery E and has one terminal of the winding of relay R1 connected thereto, the other terminal of said winding being connected to the conductor 10 which leads back to the other terminal of the battery E. Due to the current flow in the circuit just described, the relay R1 is maintained in energized condition and, accordingly, its armature 11 is maintained in the position illustrated in Fig. 5.

Should the last described circuit be broken or should the current flow therein decrease to an abnormal extent, the relay R1 is deenergized, its one armature 11 moving into engagement with the contact at the end of conductor 13 and its other armature 16 moving into engagement with the contact at the end of conductor 14.

As a first result of the just described deenergization of relay R1, a circuit is established from the positive terminal of battery E1, conductor 13, conductor 15, the signal device S, conductor 14, armature 16 of relay R1, conductor 10 and thence back to the negative terminal of battery E1 by way of the conductor 12. Accordingly, the signal device S is actuated to thereby indicate an abnormal condition of the battery E.

As a second result of the above described deenergization of relay R1, the positive terminal of battery E1 is connected by conductor 13 to the armature 11 of said relay R1. The negative terminal of battery E1 is permanently connected by the conductor 12 to the conductor 10 and, accordingly, as will be obvious from Fig. 5, the armature 11 of relay R1, by moving to its deenergized position, substitutes the battery E1 for the battery E.

In the manner described above, an indication is obtained of an abnormal condition of the main battery E by current flowing from the auxiliary battery E1. At the same time, and during the persistence of said indication, the auxiliary battery E1 is substituted for the battery E to thereby maintain the entire system in its operative condition.

When the battery E is restored to its normal condition, relay R1 is energized and, accordingly, the main battery E is restored to service, the battery E1 being automatically eliminated.

*Control exercised by temperature responsive device A upon predetermined increase of ambient temperature*

As hereinbefore described in connection with the supervision of the temperature responsive device A and under normal conditions, the winding characteristics of relays R and R2 are different to an extent permitting operation of the relay R but insufficient to cause operation of the relay R2. Accordingly, under normal operating conditions, the armatures of relays R and R2 are in the position illustrated in Fig. 5.

Should the temperature responsive device A be exposed to a fire condition or to ambient temperature sufficiently high to cause the mercury column in the tube $b$ to become elevated sufficiently to engage or move past the conductor $h1$, it results that the prior existing circuit through the relay R is shunted out, this being effected by the column of mercury which now connects the conductors $h$ and $h2$ together. Due to the low resistance of this column of mercury as compared with the resistance of the winding of relay R, sufficient current traverses the winding of relay R2 to cause energization of the same. Relay R2, accordingly, attracts its armatures 17 and 18. The latter, due to its movement from the contact at the end of conductor 20, opens the heretofore described circuit of the winding of relay R3, this circuit including the signal devices S1, S2 and the remotely positioned signal device. As a result, relay R3 is deenergized and its armature 24 moves into engagement with the contact at the adjacent end of conductor 27.

Energization of relay R2, as described above, causes actuation of the signal devices S2 and S1, the energizing circuit for the latter extending from the positive terminal of battery E, conductor 9, conductor 23, signal device S2, conductor 22, signal device S1, conductor 21, armature 18 of relay R2, conductor 30, and thence by way of the conductor 10 back to the negative terminal of battery E.

Energization of relay R2 also causes actuation of the remotely positioned signal device, the energizing circuit therefor extending from the positive terminal of the main battery E, conductor 9, conductor 26, armature 17 of relay R2, conductor 19, conductor 31, the remotely positioned signal device, conductor 32, conductor 21, armature 18 of relay R2, conductor 30, and thence by way of conductor 10 back to the negative terminal of battery E.

Deenergization of the relays R and R3 causes actuation of the signal device S3, the energizing circuit for the latter extending from the positive terminal of the main battery E, conductor 9, conductor 23, armature 24 of relay R3, conductor 27, conductor 28, the signal device S3, conductor 29, and thence back to the negative terminal of battery E by way of conductor 10; a parallel circuit for energizing the signal device S3 extends from conductor 9, and includes the conductor 26, armature 25 of relay R, conductor 27, conductor 28, the signal device S3, and thence by way of the conductor 29 back to the other battery conductor 10.

The hereinbefore described signal devices may be of such character as is suitable or desirable. They may be audible, visual, or a combination thereof; if desired, some or all of the signal devices may be replaced by other control mechanism utilizable for any desired purpose. However, in accordance with preferred present practice, it is desirable that the signal devices S and S3 be ordinary bells; that the signal device S1 be a fire gong of the vibrating type; that the signal device S2 be a fire gong of the single stroke type; and that the remotely positioned signal device be a gong having suitable characteristics.

As above stated, the signal device S3 operates in response to the presence or instigation of an open circuit in the main electrical circuit, namely, the circuit connected to the conductors $h1$ and $h2$ of the device A; furthermore, said signal device S3 operates in the event of trouble, as a broken wire or loose connection, in the signal devices S1, S2 or the remotely positioned signal device.

The signal device S indicates that the main battery E has become exhausted or that it is not properly supplying current to the main electrical circuit, as aforesaid. As hereinbefore specifically pointed out, the auxiliary battery E1 is automatically substituted for the main battery E should the latter fail to function properly. The initiation of operation of the signal device S is effected as soon as such substitution has taken place and the operation thereof continues until the main battery E has been restored to service.

The signal devices S, S2 and the remotely positioned signal device are actuated upon the occurrence of a fire condition or a temperature simulation thereof in the immediate vicinity of the device A. Obviously, the signal devices S1 and S2 are of extreme importance in the operation of my system and, as pointed out above, they are under direct supervision so that corrective measures may be taken should they not be in operative condition. As an added measure of safety and as hereinbefore pointed out, the signal device S3 is also operative in conjunction with the signal devices S1, S2 and the remotely positoned signal device upon the occurrence of a fire condition, as aforesaid.

The remotely positioned signal device may or may not be utilized as desired. In the event that this device is to be omitted, the armature 17 of relay R2 is blocked open and insulated in any suitable manner; at the same time, an electricity-conducting strap or "jumper" is connected across the conductors 31 and 32.

Ordinarily, it is desirable that both the signal devices S1 and S2 be utilized in the manner described; however, under some circumstances it may be desirable to utilize but one of them. As pointed out above, the signal devices S and S3 are ordinary bells; obviously, however, the frequency of the sound produced by each should differ in an identifying manner.

A temperature responsive system and particularly the herein described device A thereof is utilizable in many ways in accordance with my invention. A particular application relates to the use thereof in the powder magazines of war vessels. In such magazines, there is great danger of an explosion should the temperature rise above a certain value. However, with one or more of the temperature responsive devices A in the magazine, an alarm invariably is given when the temperature rises to a predetermined value.

In connection with such a device, an important feature of my invention relates to the arrangement for actuating a suitable signal in the event that the mercury bulb is fractured. On a war vessel, heavy seas and gun fire cause intense vibration of the vessel structure and such vibration, when transmitted to the relatively delicate bulb structure, is quite apt to cause fracture. If this happens with the system of my invention, the mercury leaks from the bulb $a$ and tube $b$ whereby the circuit between the conductors $h1$ and $h2$ is opened. As stated above, opening of this circuit produces a significant signal whereupon steps may be immediately taken to substitute an operative temperature responsive device for the one just rendered inoperative.

Further in accordance with my invention, removal of the device A from the base plate $j$ causes the circuit to be opened between the contact elements $k, k$ and, when this circuit is opened, a significant signal is given. This is an added measure of safety rendering it impossible, without the giving of an alarm, for someone to render the system non-operative by unauthorized removal of one of the devices A.

From the foregoing, it clearly appears that the system of my invention is fully and efficiently operable for temperature indicating purposes. At the same time and of great importance, the system is supervised in the respects noted above, this being distinctly advantageous as stated.

Under some circumstances, it is desirable, as in some refrigeration and cold storage systems, that an indication be given if the temperature recedes below a certain minimum value. The device A operates satisfactorily for such a purpose because any recession of the mercury column below or from the contact $h1$ effects a suitable control or causes a signal to be given.

Obviously, the device may be calibrated in accordance with the requirements to be met. For a given size of bore for the tube $b$, the contact members $h, h1$ and $h2$ may be spaced therealong in suitable manner so that predetermined increase or decrease of ambient temperature causes the mercury column either to rise or fall sufficiently for the purposes noted above.

It shall be understood that my invention is not to be limited to all of the features of the control circuit of Fig. 5, nor is it to be limited even to certain features of that control circuit because, as will be understood, the invention is utilizable in connection with other control circuits.

Referring to Fig. 6, M, M1 may be assumed as representing powder magazines such as exist on war vessels, for example, a suitable passageway W separating said magazines and serving as a means of communicating therewith. In the passageway W, there may be a suitable carriage C which is movable therethrough along suitable rails B.

Suitably disposed in each of the magazines M, M1 is or are one or more of the hereinbefore described temperature responsive devices A each associated with a base $f$. Extending from each of the devices A is a cable D which may be considered as comprising or containing the hereinbefore described conductors 7, 8, 9 and 10.

Suitably disposed along the ceiling, walls and/or floor of the passageway W is a fire detecting cable E which may be and preferably is of the character disclosed in my copending application Serial No. 352,624, filed April 5, 1929.

As disclosed in said application, the cable E may be such as comprises a fusible core 41 disposed in a longitudinally slotted sleeve 42 encircled by a surrounding layer of insulation 43 having a sheath 44 disposed thereon, the sheath 44, in turn, carrying a waterproof envelope 45 and a fabric envelope 46. The aforesaid core 41 and sheath 44 are constructed from electricity-conducting material and form sides of an electrical circuit which is short-circuited when the core is subjected to temperature of such magnitude as will cause the same to become molten.

In accordance with my invention, the conductors of the cables D are suitably associated in circuit relation with the core 41 and sheath 44 of the aforesaid cable E whereby either of the devices A or the cable E may be actuated as hereinbefore described to actuate any of the signals or affect any of the controls described in connection with Fig. 5. One such circuit relation is shown in Fig. 7 wherein the cable E is diagrammatically illustrated as comprising the fusible core 41 and the sheath 44, the respective ends of the core 41 being connected to the hereinbefore described conductors 8 and 10, an extension 8a of the conductor 8 being connected to the conductor $h$ of one device A and an extension 10a of the conductor 10 being connected to the conductor $h$ of the other device A. The hereinbefore described conductor 9 is connected to the conductor $h2$ of one device A, the conductor $h1$ of said last named device being connected by a conductor 9a to one end of the sheath 44, the other end of which is connected by a conductor 7a to the conductor $h2$ of the other device A, the conductor $h1$ of said last named device being connected to the hereinbefore described conductor 7.

If the arrangement of Fig. 7 is to be associated with a control circuit of the character shown in Fig. 5, it will be understood that the conductors 7 and 8 of Fig. 7 lead to and include the winding of relay R, the conductor 10 of said Fig. 7 including the winding of relay R2 and being connected to one terminal of the battery E and the conductor 9 of said Fig. 7 being connected to the other terminal of said battery E.

Accordingly, with the arrangement described immediately above, the circuit from the battery E of Fig. 5 extends from one terminal thereof by way of conductor 10 to and through the winding of relay R2, to and through the core 41 of the cable E, conductor 8, to and through the winding of relay R, conductor 7, conductor $h1$ of the device A at the right, Fig. 7, the column of mercury in said device A, conductor $h2$, conductor 7a, to and through sheath 44 of cable E, conductor 9a, conductor $h1$ of the device A at the left, Fig. 7, the mercury column of said last named device A, conductor $h2$, conductor 9 and thence back to the terminal of the battery E. As shown, the conductors 10 and 8 include, respectively, the branches 10a and 8a which are connected to the respective conductors $h$ of each of the devices A.

With the circuit arrangement of the character just noted, the operation is the same as heretofore described in connection with Fig. 5. That is, the current flow from the battery E over the circuit specifically outlined is sufficient to cause operation of the relay R but insufficient to cause operation of the relay R2. Accordingly, if the cable E and the devices A of Fig. 7 remain in normal condition, the circuit arrangement remains as illustrated in Fig. 5 and no control or signal function is exercised. However, should the main control circuit become open for any manner such, for example, as might be occasioned by fracture of the bulb of either device A, recession of the mercury column in either device A below the conductor h2 thereof, an unexpected break in either the core 41 or sheath 44, the occurrence of a loose connection sufficient to open the circuit, etc., it immediately follows that the relay R is deenergized to effect the control functions hereinbefore described.

Further, if the mercury column in either of the devices A should ascend sufficiently so as to come into contact with either of the conductors h, or if the cable E should be subjected to a fire condition whereby the core 41 and sheath 44 are short-circuited, the relay R is deenergized and relay R2 is energized sufficiently to cause operation thereof, whereby the various control and signal functions are effected as hereinbefore described.

A particular advantage of my invention as illustrated in Fig. 7 resides in the fact that the thermometric devices A, on the one hand and the cable E, on the other hand, are combined in a fully supervised system. Ordinarily, the cable E is so designed that subjection of the core 41 thereof to an ambient temperature magnitude of about 160° F. is sufficient to cause said core 41 to become molten and cause the described short-circuiting action although, obviously, this may be varied as desired depending, for example, upon the character of the material entering into said core 41. The devices A, usually, are so designed that the mercury column comes into contact with the conductor h when said mercury column is subjected to an ambient temperature magnitude considerably less than that noted above with respect to the cable E. Thus, in accordance with my invention, the control circuit may include dissimilar devices operative upon attainment or occurrence of substantially different ambient temperature magnitudes. An arrangement of this character is highly desirable in connection with the protection of powder magazines on warships as stated above. However, the invention is not to be thus limited because such an arrangement is also desirable and useful in various other ways; for example, one or more of the devices A may exercise a control upon predetermined decrease in temperature of a refrigerating vault while the cable E gives protection against a fire condition outside the vault.

It shall be clearly understood that my invention is not to be limited to a combination including one or more of the devices A and a cable E, nor, by any means, is my invention to be limited precisely to the arrangement shown in Fig. 7. Thus, in connection with the general arrangement of Fig. 7, it clearly appears that as many of the devices A may be used as desired and, likewise, that there may be a plurality of cable sections E. Further, the circuit arrangement may be quite different from that herein described depending upon the character of the desired control.

While the invention has been described with respect to certain particular preferred examples which give satisfactory results, it will be understood by those skilled in the art after understanding the invention, that various changes and modifications may be made without departing from the spirit and scope of the invention and it is intended therefore in the appended claims to cover all such changes and modifications.

What is claimed as new and desired to be secured by Letters Patent is:

1. In an electrically supervised system for indicating the existence of undesirable thermal conditions, a closed circuit including a source of electrical energy, a normally inoperative electrical control device, a normally actuated electrical control device, and a thermo-responsive device comprising a confined electrically conductive expansible fluid constituting a part of the closed circuit and a contact element mounted in the path of the fluid and positioned to make an electrical contact therewith upon the existence of predetermined thermal conditions, the contact being connected in the crcuit to shunt a portion of the circuit upon contact with the fluid and effect the operation of the normally inoperative control device.

2. In an electrically supervised system for indicating the existence of undesirable thermal conditions, a closed circuit including a source of electrical energy, a normally inoperative electrical control device, a normally actuated electrical control device, and a thermo-responsive device comprising a casing having a chamber and a restricted passage communicating with the chamber, mercury within the chamber and normally occupying a portion of the restricted passage and forming a portion of the closed circuit and a contact element mounted in the portion of the restricted passage normally empty and positioned therein to make contact with the mercury upon the existence of predetermined thermal conditions, the contact being connected in the circuit to shunt a portion thereof and effect the operation of the normally inoperative control device.

3. In an electrically supervised system for indicating the existence of undesirable thermal conditions, a closed circuit including a source of electrical energy, a normally inoperative electrical control device, a normally operated electrical control device, and a thermo-responsive device comprising an electrically conductive element movable in accordance with changes in thermal conditions, a pair of spaced conductors electrically engaging the movable element at normal room temperatures and connecting the movable element into the closed circuit as a conducting part thereof, and an additional conductor positioned to engage the movable element at abnormal thermal conditions and connect the movable element into the circuit to shunt a portion thereof and effect the operation of the normally inoperative control device.

WILLIAM D. LINDSEY.